Figure 3:
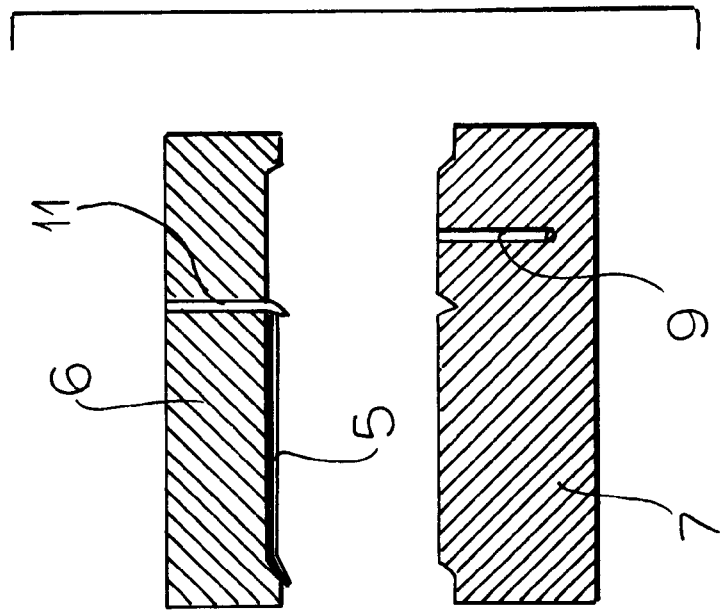

United States Patent [19]
Rehm et al.

[11] Patent Number: 6,027,678
[45] Date of Patent: Feb. 22, 2000

[54] PROCESS AND DEVICE FOR MANUFACTURING THIN-WALLED LAMINATED MOLDINGS

[75] Inventors: Guido Rehm, Passau; Konrad Zweig, Augsburg, both of Germany

[73] Assignee: Krauss-Maffei AG, Munich, Germany

[21] Appl. No.: 08/776,432

[22] PCT Filed: May 11, 1996

[86] PCT No.: PCT/EP96/02027

§ 371 Date: Apr. 11, 1997

§ 102(e) Date: Apr. 11, 1997

[87] PCT Pub. No.: WO96/36474

PCT Pub. Date: Nov. 21, 1996

[30] Foreign Application Priority Data

May 17, 1995 [DE] Germany ............................ 195 18 143

[51] Int. Cl.[7] .............................. B29C 45/13; B29C 45/14
[52] U.S. Cl. ......................... 264/255; 264/266; 425/577; 425/129.1; 425/130
[58] Field of Search .................................. 264/250, 254, 264/255, 266, 278, 294, 319, 296, 275, 271.1; 425/116, 120, 121, 577, 125, 129.1, 130

[56] References Cited

U.S. PATENT DOCUMENTS

| | | |
|---|---|---|
| 4,335,068 | 6/1982 | Hemery . |
| 4,873,045 | 10/1989 | Fujita et al. . |
| 5,256,235 | 10/1993 | Howell et al. ............................ 156/286 |
| 5,534,216 | 7/1996 | Kamiyama ............................ 264/511 |
| 5,811,053 | 9/1998 | Ota et al. ............................ 264/511 |

FOREIGN PATENT DOCUMENTS

| | | |
|---|---|---|
| 0 253 909 | 1/1988 | European Pat. Off. . |
| 0 333 198 A2 | 9/1989 | European Pat. Off. . |
| 1 529 757 | 1/1970 | Germany . |
| 37 33 287 A1 | 4/1989 | Germany . |
| 41 01 106 A1 | 7/1992 | Germany . |
| 43 36 878 A1 | 5/1994 | Germany . |
| 44 28 626 A1 | 3/1995 | Germany . |
| 44 43 t145 C1 | 3/1996 | Germany . |
| 195 18 143 C1 | 10/1996 | Germany . |
| 63-011312 | 1/1988 | Japan . |
| 61376118 | 7/1988 | Japan . |

*Primary Examiner*—Angela Ortiz
*Attorney, Agent, or Firm*—Herbert Dubno

[57] ABSTRACT

A process is disclosed for manufacturing thin-walled moldings with a ground layer (4) made of thermoplastic materials and a covering layer (5) made of prefabricated flat covering materials pressed together with the ground layer by a back pressing technique in a form tool (8) having a top die (6) and a bottom die (7). The object of the process is to produce thin-walled moldings having laminated and non-laminated areas in a simple manner, with no danger of damaging sensitive covering layer materials and with non-laminated areas having a high quality surface. For that purpose, during or after back pressure lamination, while or after the two dies are closed, besides at least one molding area (2) laminated with a covering layer by a back pressing technique, at least another area (3) of the molding is produced by injection molding thermoplastic material in the part of the molding cavity (17) in which the area of the molding which is not laminated with a covering layer (5) is produced.

10 Claims, 4 Drawing Sheets

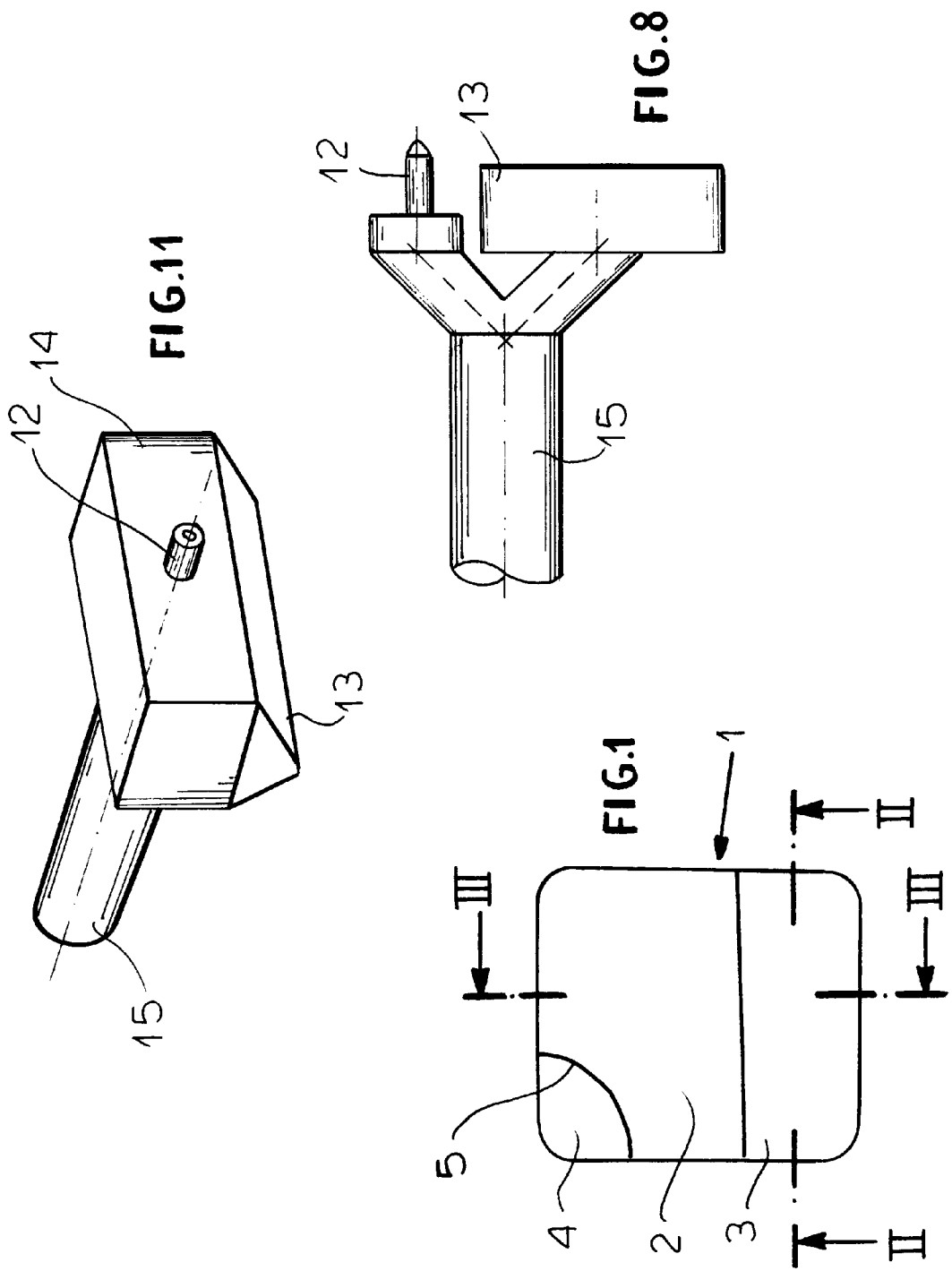

PROCESS AND DEVICE FOR MANUFACTURING THIN-WALLED LAMINATED MOLDINGS

The invention relates to a process and a device for manufacturing flat thin-walled moldings with a ground layer made of thermoplastic materials and a covering layer made of prefabricated flat covering materials pressed with the ground layer by a back pressing technique by means of a form tool having a top mold half and a bottom mold half, whereby the ground layer pressed with the covering layer is introduced into the open form tool prior to back pressing with the covering layer into a flat thin-walled molding.

A process of this kind is known from U.S. Pat. No. 4,873,045, wherein the introduction of the ground layer in the bottom mold is done by extrusion, whereby a slotted nozzle attached to a plastifying unit is moved over the lower mold half and applies to the lower mold half a layer of thermoplastic material corresponding to the desired layer thickness. In the subsequent process step, wherein the upper mold half together with the covering layer is pressed against the lower mold half, the extruded and still molten ground layer is pressed with the covering layer.

A process like the one mentioned in the preamble of claim 1 is also known from the German Patent Application P 41 01 106.6, which proposes to produce the ground layer through a preliminary injection molding process in a flat thin-walled form suitable for the subsequent back pressing process, which to a great extent already has the contours of the finished molding.

These known processes have the disadvantage that the finished molding can be produced only with a covering layer connected by back pressing technique, since during the pressing of surface sections without covering layer it is not possible to obtain a satisfactory surface quality.

It has also been proposed to produce single-piece moldings with partially laminated and partially nonlaminated surfaces, in that during the lowering of the upper mold provided with a covering layer, flowable melt is injected into the lower mold half according to the so-called overflow process. However in this case, as can be seen from EP 0 333 198 very definite parameters have to be observed, i.e. the introduction of melt can take place only at a point in time when the mold halves of the form tool are not yet completely closed, but have to complete a remaining form closing path not longer than 100 mm and not shorter than 5 mm, whereby during the introduction of the melt the form closing motion has to be stopped, or slowed down to less than 30 mm/sec. Only when these parameters are observed it can be insured that, at too short a distance, the covering layer is not exposed to and thereby damaged by the mechanical and thermal effect of the intruding melt, while when the distance is too big the danger of skin formation, which leads to the formation of folds in the finished molding, is prevented.

This latter described process is therefore also very expensive for the production of moldings with a partially laminated and partially nonlaminated surface, and can not be used especially for decorative materials with sensitive surface layers on the melt side.

It is therefore the object of the invention to develop a process of the kind mentioned in the introduction and a device for carrying out this process so that single-piece thin-walled moldings can be produced with laminated and nonlaminated sections in a simple way, without the danger of damaging sensitive components of the covering layer and with a high surface quality of the nonlaminated sections of the molding.

In order to achieve this object the invention proposes a process of the kind mentioned in the introduction, which is characterized in that during the or after the back pressing, i.e. during or after the closing of the two mold halves, next to at least one section of the molding having a covering layer laminated through the back pressing technique, at least a further section of the molding is produced through the conventional injection molding technique, i.e. by injecting a melt of thermoplastic material into the cavity of the mold of the section which is not laminated with a covering layer for a single-piece molding.

It is essential for the invention that the ground layer be brought into the lower mold half according to the processes (e. g. U.S. Pat. No. 4,873,045 or DE 41 01 106), which have proven suitable also for the back pressing of sensitive covering layers and that no application on the covering layer with flowable melt injected through a nozzle be performed, as proposed in the process known from EP 0 333 198, wherein only by observing a multitude of parameters it is possible to avoid damaging the covering layer by the melt.

In an advantageous embodiment of the invention, the mold cavities of the sections which are not back pressed with a covering layer can be closed off by means of one or several separation tongs, whereby the closing is reversed at a point in time when the back pressing of the covering layer with the ground layer has already taken place and when this is also still in a molten state, so that an intimate bond with the molten material introduced with the conventional injection process results.

Therefore it can be advantageous, especially when processing sensitive covering layers, to slightly raise the upper mold half after the ground and covering layers are pressed, in order to protect the covering layer, and to fully close the mold again, prior the completion of the injection molding process for the nonlaminated sections.

The device for carrying out the process comprises a form tool consisting of a bottom and a top mold half, which is characterized in that it includes two or more interconnected partial mold cavities, of which the mold cavity or cavities for the sections which are not supposed to be pressed with a covering layer have each one or several melt channels leading to one or more plastifying units.

Especially when the feeding lines are longer the melt channels are preferably heated channels, in order to insure that the sections produced through the conventional injection process can be finished with the required surface quality.

For the cases when the ground layer of the parts to be pressed with the covering layer has to be made of a different plastic material than the material for the laminated sections, different plastifying units are provided. This way it is possible to produce the laminated surface sections with for instance different colors.

In an advantageous embodiment of the invention only one plastifying unit is provided, whose melt channels branch off, whereby a melt channel leads to the slotted nozzle by which the molding sections for the surface areas to be laminated can be coated with a wide melt strand, and a melt channel leads to a conventional injection nozzle which can be attached to the melt channel at the lower mold half, through which the melt can be injected into the mold cavity for the nonlaminated molding section. Optionally in the lower mold half this melt channel is designed as a heated channel, which ends over several branches in the mold cavity.

The slotted nozzle and the injection nozzle can also be components of an injection head connected to the plastifying unit, wherein a switching device has been provided, by means of which it is possible to shut off the melt flow to the slotted nozzle or to the injection nozzle.

Figure 2:
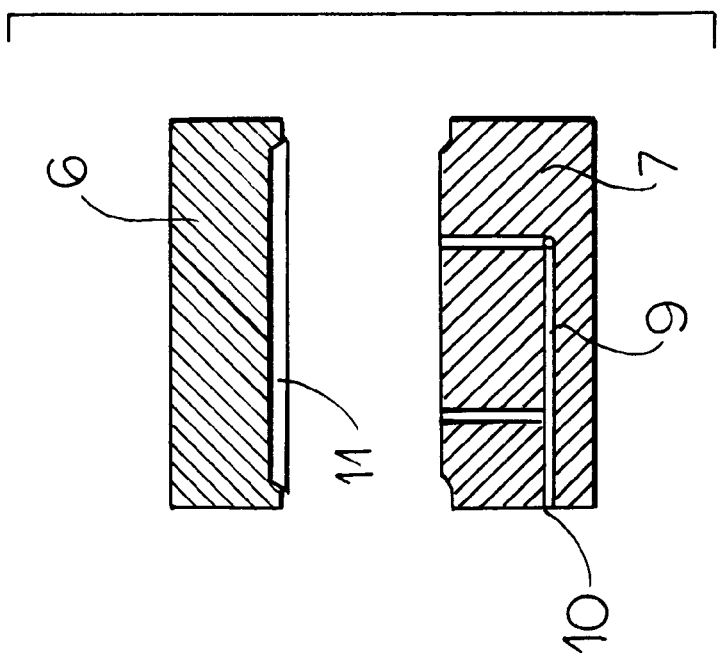
Figure 5:
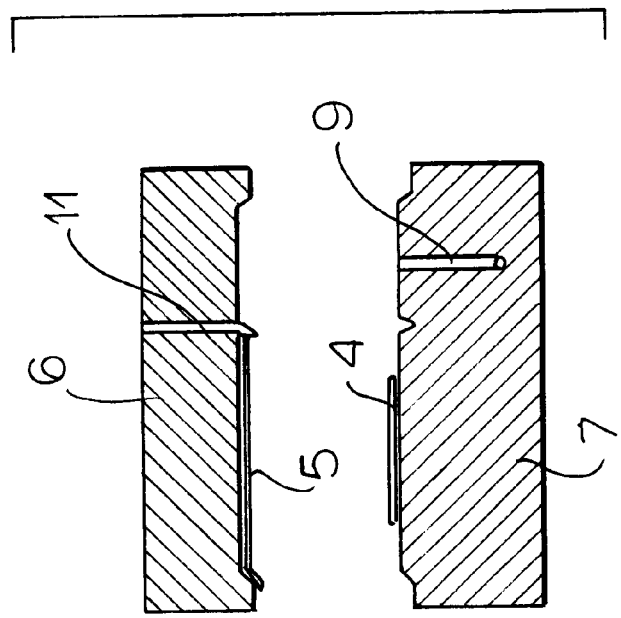
Figure 4:
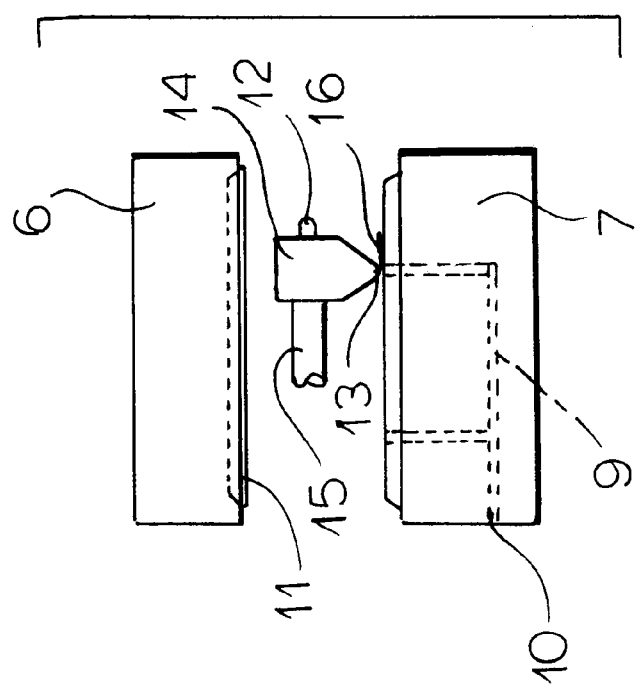
Figure 6:
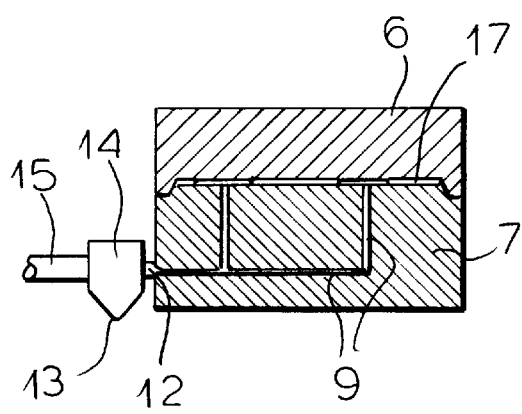
Figure 7:
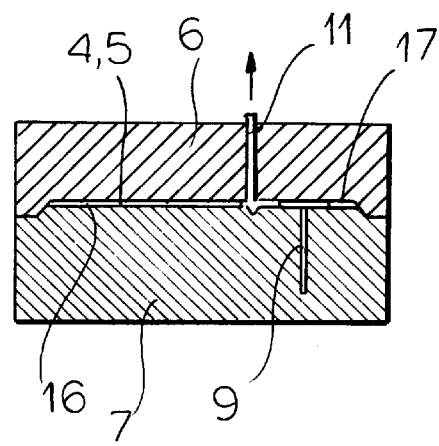

Embodiments of the invention are subsequently closer described with the aid of the drawing. It shows:

FIG. 1 a thin-walled flat molding with a section laminated with a covering layer and a nonlaminated section, FIG. 2 the opened form tool with a top and a bottom mold half corresponding to the sectional view II—II in FIG. 1, FIG. 3 the opened form tool according to FIG. 2 in a sectional view III—III in FIG. 1, FIG. 4 the opened form tool according to FIG. 2 with applied slotted nozzle during the deposition of a wide melt strand for the ground layer to be pressed, FIG. 5 the opened form tool according to FIG. 3 with deposited wide ground layer strand, FIG. 6 the closed form tool with applied injection nozzle and branched off melt channel, FIG. 7 the closed form tool with the ground layer pressed with the covering layer and partially filled mold cavity for the nonlaminated section.

FIG. 8 a plastifying unit with a melt channel branching off to an injection nozzle and a slotted nozzle.

Figure 9:
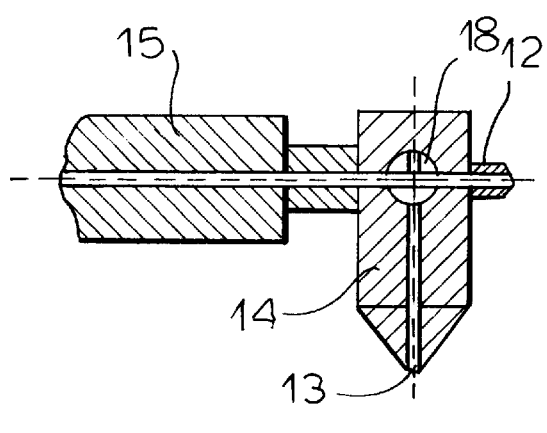
Figure 10:
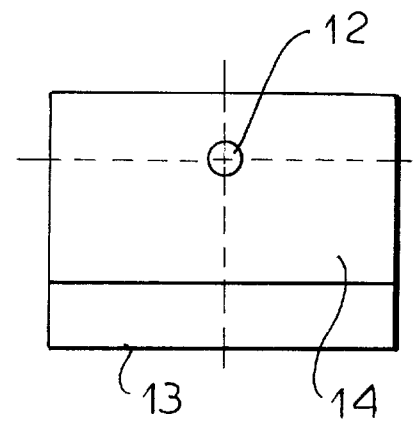

FIG. 9 a section through an injection head connected to a plastifying unit with a switch valve for selecting the feeding line to an injection nozzle or a slotted nozzle, FIG. 10 a frontal view of the injection head in FIG. 9 and FIG. 11 the injection head according to FIGS. 9 and 10 in a perspective view.

FIG. 1 shows a flat thin-walled molding 1 with a laminated section 2 and a nonlaminated section 3. The laminated section 2 consists of a ground layer 4 and a covering layer 5. The ground layer 4 and the entire nonlaminated section 3 consist of a thermoplastic material. The covering layer 5 can be made of any desired prefabricated flexible material, e.g. fabric, plastic material with leather embossing or the like. It is particularly advantageous to make the covering layer 5 of plastic sheet, e.g. with leather-like surface embossing and an underlying cushioning layer made of a yielding material such as foam material. By pressing it with the not yet solidified thermoplastic material of the ground layer, which means that it is still flowable at least at the surface, the covering layer 5 is undetachably bonded with the ground layer. This bonding technique is also called back pressing technique, according to which components for automotive interiors, such as for instance door trimmings are advantageously produced.

FIG. 2 shows the form tool 8 consisting of an upper mold half 6 and a lower mold half 7. The lower mold half 7 has branched off melt channels 9 with an injection inlet 10. In the upper mold half 6 a separating tong 11 is arranged. FIG. 3 shows the opened form tool 8 in another direction of vision, with the separating tong 11 arranged in the upper mold half 6 and the covering layer 5. In the lower mold half 7 a notch for engaging the separating tong 11 is provided.

FIGS. 4 and 5 represent the form tool according to FIGS. 2 and 3, with an injection head 14 which is connected to a plastifying unit 15 and equipped with an injection nozzle 12 and a slotted nozzle 13. By means of the slotted nozzle 13 a melt strand 16 is applied to the lower mold half 7.

According to FIG. 6 at the injection inlet 10 of the closed form tool 8 an injection nozzle is applied, which via melt channels 9 injects a plastic melt into the mold cavity 17 (FIG. 7).

FIG. 7 shows the closed form tool 8, whose mold cavity is subdivided by a separating tong 11 into a mold cavity 16 for the laminated section 2 and a mold cavity 17 for the nonlaminated section 3. The separating tong 11 is thereby already partially pulled, so that the melt injected into the mold cavity 17 can already bond with the border area of the finished section 2 of the molding 1 which is already laminated with the covering layer 5.

FIG. 8 illustrates a plastifying unit 15, whose melt channel branches off to an injection nozzle 12 and a slotted nozzle 13.

In FIGS. 9, 10 and 11 an injection head 14 connected to a plastifying unit 15 is shown, whereby by means of a switch valve 18 the plastic melt from the plastifying unit 15 can be selectively directed either to the injection nozzle 12 or the slotted nozzle 13. In a further switching position the switch valve 18 acts as a shutoff valve.

We claim:

1. A method of making a thin-wall molding comprising the steps of:

(a) depositing a base layer of a thermoplastic material on a lower mold half;

(b) applying a prefabricated flat covering material as a cover layer to an upper mold half;

(c) closing said upper mold half onto said lower mold half to press said base layer onto said cover layer and bond said layers together into a laminate while defining between said upper and lower mold halves a mold cavity having a portion extending beyond said laminate;

(d) separating said portion of said mold cavity from said laminate with a tongue on one of said mold halves extending into a groove in the other of said mold halves;

(e) withdrawing said tongue from said mold cavity and said groove; and (f) thereafter injecting thermoplastic material into said portion of said mold cavity for bonding with said laminate.

2. The method defined in claim 1 wherein said base layer is deposited on said lower mold half in an open position of said mold halves from a slot nozzle.

3. The method defined in claim 1 wherein said base layer is deposited on said lower mold half in the form of a premolded flat member.

4. The method defined in claim 1 wherein, after closing of said upper mold half onto said lower mold half, said upper mold half is slightly raised.

5. An apparatus for making a thin-wall molding comprising:

a lower mold half adapted to receive a base layer of a thermoplastic material;

an upper mold half adapted to receive a prefabricated flat covering material as a cover layer;

means for closing said upper mold half onto the lower mold half to press said base layer onto said cover layer and bond said layers together into a laminate, said upper and lower mold halves defining a mold cavity having a portion extending beyond said laminate;

a tongue on one of said mold halves extending into a groove in the other of said mold halves, said tongue being retractive from said groove and said portion of said mold cavity; and means for injecting thermoplastic material into said portion of said mold cavity for bonding with said laminate.

6. The apparatus defined in claim 5 wherein said means for injecting thermoplastic material into said portion of said mold cavity includes at least one melt channel communicating with at least one plastifying unit.

7. The apparatus defined in claim 6 wherein at least one of said melt channels is a heated channel.

8. The apparatus defined in claim 6 wherein a plurality of plastifying units is provided for supplying respective melt channels with respective thermoplastic materials.

9. The apparatus defined in claim 6 wherein a slot nozzle connected to said plastifying unit is provided to deposit said base layer on said lower mold half.

10. The apparatus defined in claim 9 wherein said nozzle is connected to a nozzle communicating with said melt channel.

* * * * *